Figure 4:
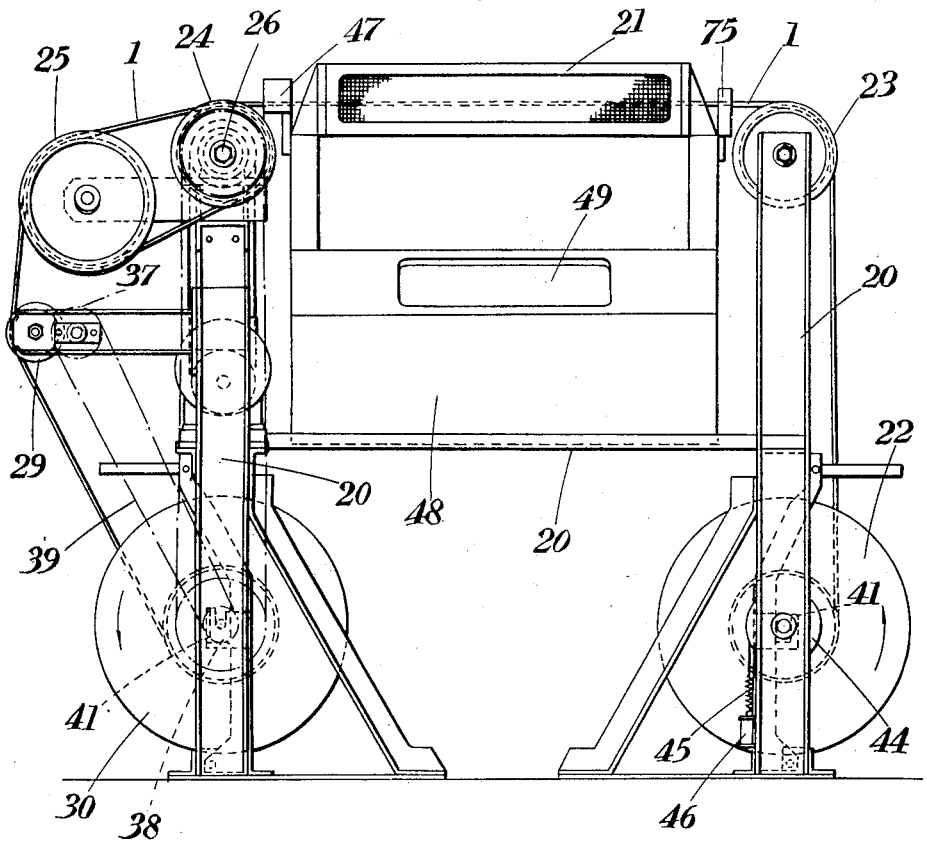

July 20, 1937.  J. H. SAVAGE  2,087,783
MEANS FOR TESTING ELECTRIC INSULATION
Filed Dec. 27, 1935    4 Sheets-Sheet 1
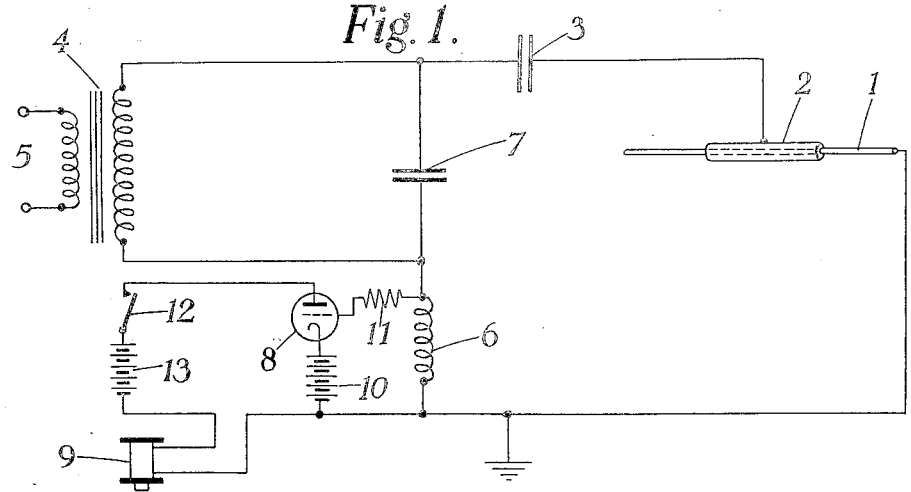
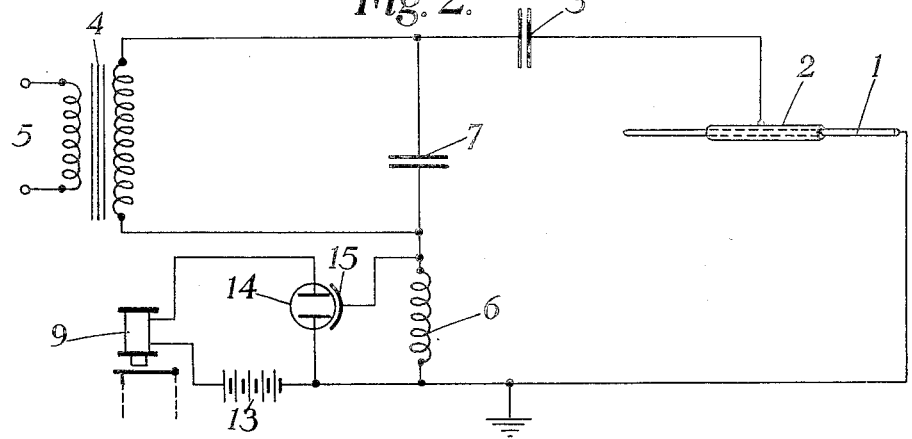
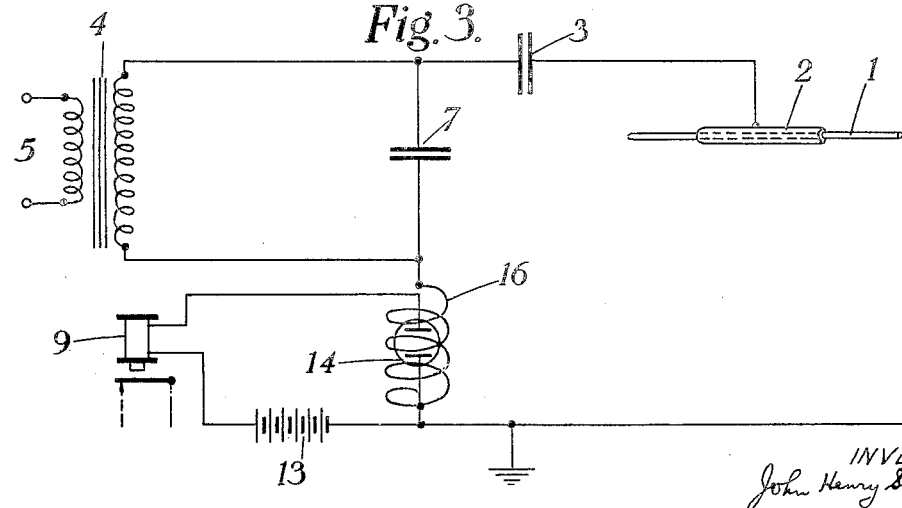
INVENTOR
John Henry Savage
BY Stebbins, Blenko + Parmelee
his ATTORNEYS July 20, 1937.  J. H. SAVAGE  2,087,783
MEANS FOR TESTING ELECTRIC INSULATION
Filed Dec. 27, 1935  4 Sheets-Sheet 2

INVENTOR
John Henry Savage
BY Stebbins Blenko + Parmelee
his ATTORNEYS

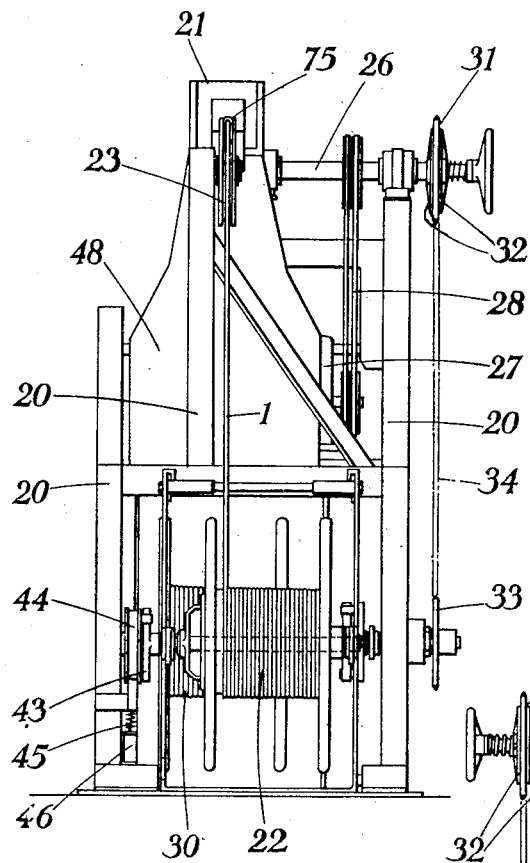
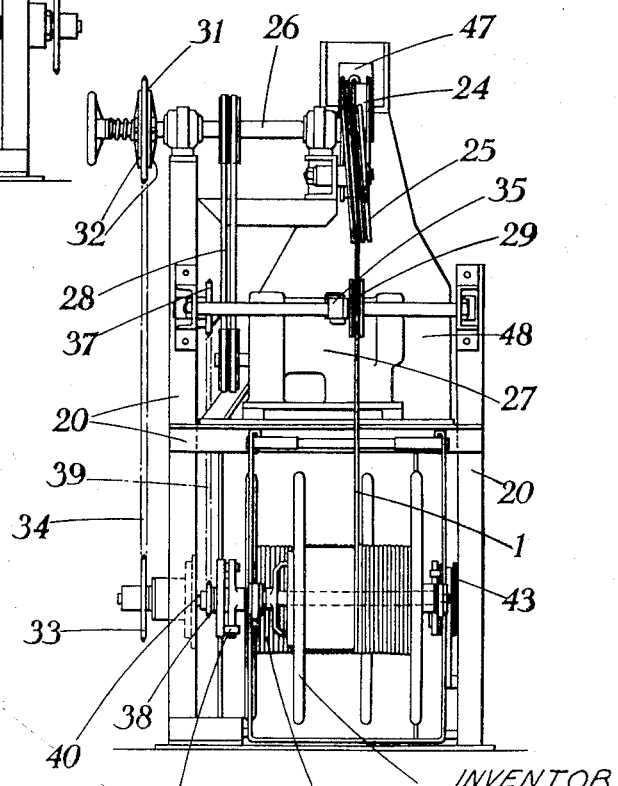

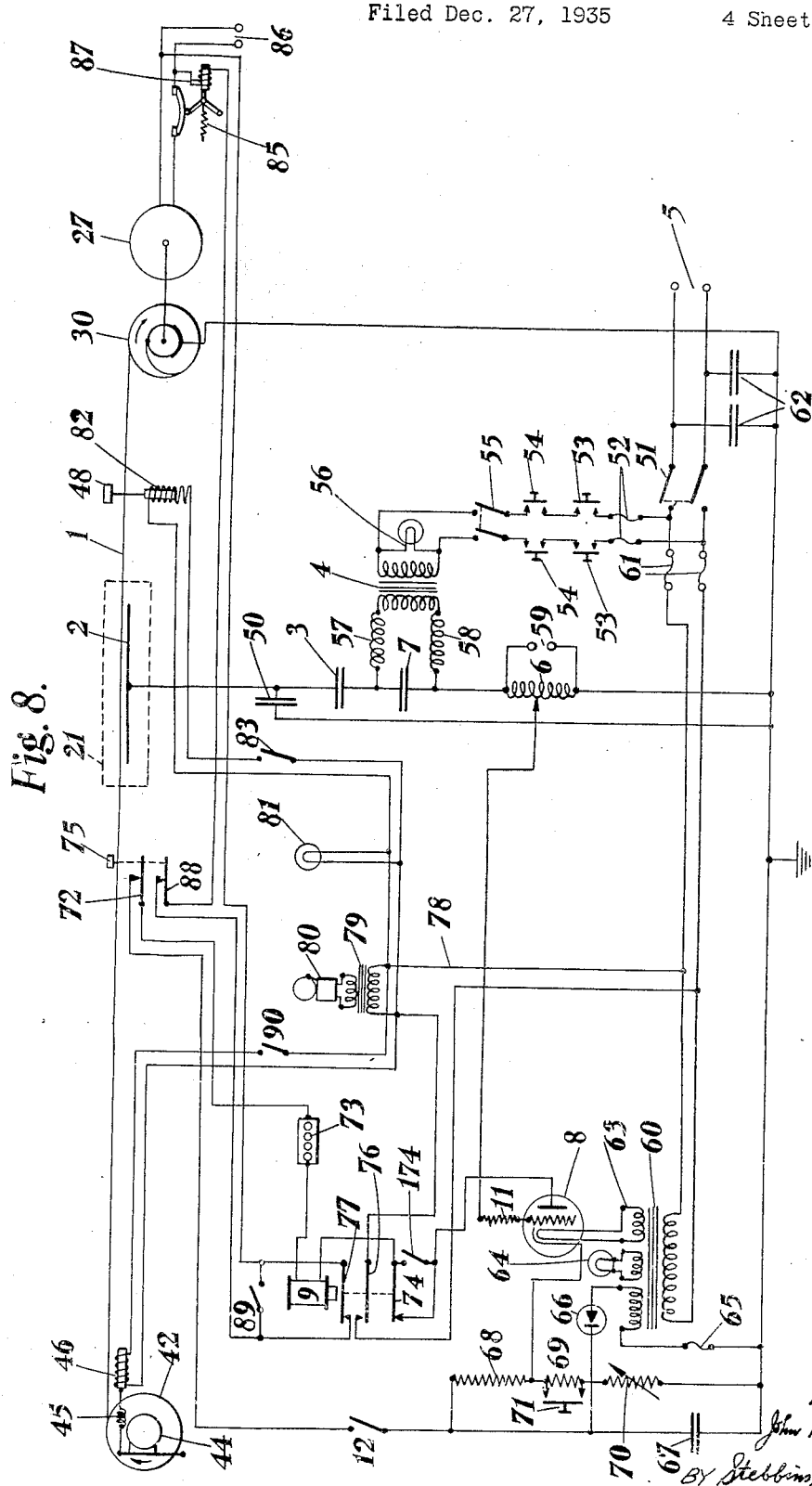

Patented July 20, 1937

2,087,783

UNITED STATES PATENT OFFICE 2,087,783

MEANS FOR TESTING ELECTRIC INSULATION

John Henry Savage, Welling, Kent, England, assignor to W. T. Henley's Telegraph Works Company Limited, London, England, a British company Application December 27, 1935, Serial No. 56,347
In Great Britain January 5, 1935

9 Claims. (Cl. 175—183)

This invention is concerned with the testing of the strength of insulating material by the application of a sufficiently high, direct, or low frequency alternating current voltage to produce complete or partial breakdown at weak points. It provides an improved arrangement of the testing apparatus which is particularly suitable for use in cases where conditions are changing continually at the test point, for instance, by the continual movement of a length of insulating material past a testing electrode or electrodes. This particular suitability is due to the fact that the apparatus enables an indication or record to be secured of a breakdown of very short duration. This would permit either a high speed of travel or a very short testing electrode to be used.

In the improved apparatus, constructed in accordance with the present invention, the discharge of electricity which takes place at a point of defect sets up high frequency currents in an appropriate oscillatory circuit. These high frequency currents are employed to exercise a trigger action on a low pressure gaseous discharge tube and start a flow of current through an operative circuit of which the tube forms part.

The conditions of the circuit in which the discharge due to a point of defect occurs are adjusted so as to insure that an oscillatory discharge takes place. For this purpose, inductance and/or capacity is added if necessary. The trigger action is preferably obtained by applying to the discharge tube a high frequency potential difference produced across a high frequency impedance in the oscillatory circuit.

The improved apparatus has the advantage that in addition to detecting faults which are such as to result in a direct puncture of the insulation by the test voltage applied it is capable of detecting incipient faults, such as a small void within a body of insulation or a small fragment of metal embedded in the insulation, which do not result in direct puncture by the applied test voltage. The increase in the low frequency alternating or continuous current used in the test circuit produced as a result of an incipient fault is infinitesimal and certainly too small to produce across even a high impedance the voltage required to trigger the gaseous discharge tube. In the improved apparatus, a fault of this kind results in a small discharge which produces a high frequency current in the oscillatory circuit. This high frequency current builds up across a high frequency impedance a high frequency voltage sufficient to trigger the tube.

Figure 7:
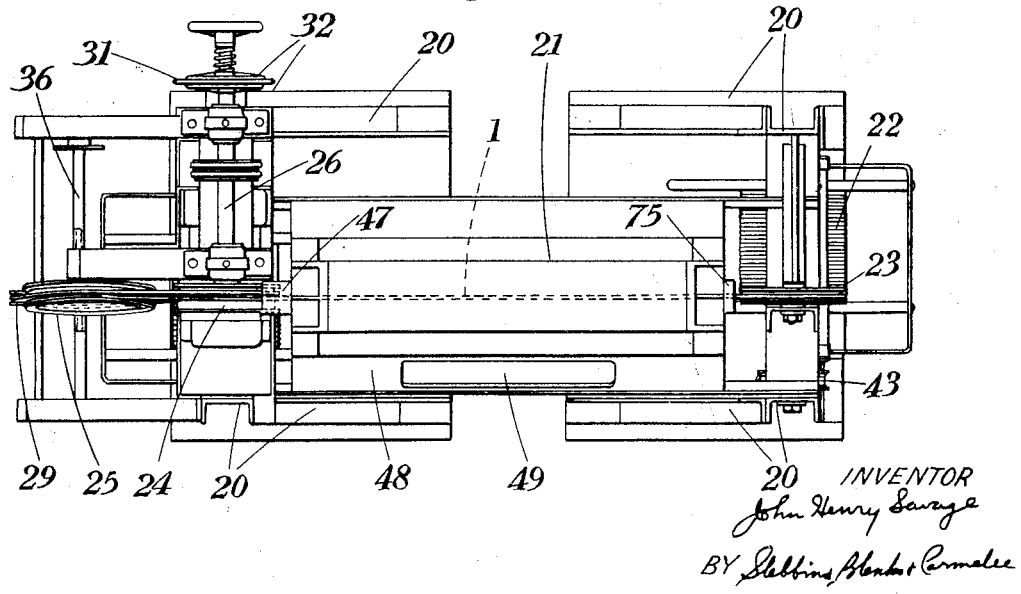

The invention will be more fully described with the aid of the accompanying drawings which diagrammatically illustrate various examples of testing apparatus constructed in accordance with the invention. In the drawings, Figure 1 is a circuit diagram of testing apparatus employing one form of gaseous discharge tube, Figure 2 is a circuit diagram of apparatus employing a second form of gaseous discharge tube, Figure 3 is a circuit diagram of apparatus employing a gaseous discharge tube which is similar to that shown in Figure 2 but has a modified form of controlling member, Figure 4 is a front elevation of an automatic cable testing apparatus constructed in accordance with the invention, Figures 5 and 6 are, respectively, elevations of the feed and delivery ends of the apparatus shown in Figure 4, Figure 7 is a plan view of the apparatus shown in elevation in Figures 4, 5 and 6, and Figure 8 is a diagram of the electrical circuit employed in the apparatus shown in Figures 4, 5, 6 and 7.

The testing apparatus shown in Figure 1 comprises a tubular electrode 2 through which is passed the insulated conductor 1. The electrode is connected through a condenser 3 to one end of the secondary winding of a high voltage transformer 4 of which the primary is connected to a suitable source 5 of alternating current supply. The other end of the secondary winding is connected to earth through a high frequency impedance, preferably an inductance 6. The conductor of the cable, which forms the other electrode, is connected directly to earth. The function of the condenser 3 is to limit the low frequency fault current to a very small value, for example, to a few milli-amps, even when the detected fault constitutes a complete short circuit. This reduces the risk of shock in the uplikely event of the operator's making contact with the live electrode, and also prevents the fault being carbonized, so that the nature of the defect can be ascertained. A condenser 7 bridges the secondary winding of the transformer and provides an easy path for high frequency oscillations. On the occurrence of a breakdown in the insulation of the cable, a discharge takes place which sets up high frequency currents in the circuit comprising the condensers 3 and 7, the high frequency inductance 6 and the test electrodes. This results in the establishment of a high frequency potential difference across the inductance 6, which is used to trigger the gaseous discharge tube 8 in an operative circuit including a relay 9. The tube 8 is a mercury vapour valve with grid control. This is arranged so that the bias on the grid prevents the passage of current between anode and cathode under normal conditions. The cathode is connected through its battery 10, representing a suitable source of supply, to the earthed end of the inductance 6 and the grid is connected to the other end of the inductance through a resistance 11 which limits the flow of grid current which might take place when a high voltage, high frequency surge reaches the valve. The anode-cathode circuit of the valve is completed through a switch 12, the anode battery 13 or the equivalent thereof, relay 9 and battery 10. Under abnormal conditions, that is on the occurrence of a fault, the high frequency potential difference established across the impedance 6 is applied between the cathode and grid. This triggers the valve which then allows current to flow through it and the relay 9 whereupon the latter becomes energized and opens or closes an external circuit. Flow of current through the valve continues until it is forcibly stopped, for instance, by opening the circuit in which it takes place by actuation of the switch 12. The latter may be arranged either to be operated by hand or automatically after a predetermined interval so as to terminate the flow of current. The switch will then be re-closed either manually or automatically in readiness for actuation when the next fault to reach the electrode is detected. Operation of the relay 9 may cut off the supply 5 of primary current to the testing transformer 4. It may also arrest the movement of the cable 1 past the test electrode 2 and/or actuate a signalling device. In addition to, or in place of, the coil of the relay 9 the operative circuit may include an indicating device or a recording device or both of these.

In the arrangement shown in Figure 2 the mercury vapour valve 8 of Figure 1 is replaced by a neon lamp 14 connected to a source of supply 13 at a voltage just below the normal discharge voltage value and having an external controlling member to which is applied the high frequency voltage across the inductance 6. This controlling member is a plate 15 placed close to the lamp and arranged to influence the electric field between the two electrodes in the lamp. In a modified form of this arrangement shown in Figure 3 the controlling member is a coil 16 surrounding the lamp so that its magnetic field influences the discharge in the lamp. This coil may also serve as the high frequency impedance 6 shown in Figures 1 and 2. In each case, the occurrence of a discharge in the test circuit, by producing a high frequency current, exerts a trigger action on the neon lamp 14 and causes the flow of current through it to commence. This discharge will continue until the circuit in which it takes place is opened or the voltage is appropriately reduced.

It is to be noted that, when the discharge of a mercury vapour valve or a neon lamp has been started by the trigger action of the circuit, the discharge is accompanied by a visible glow which gives an indication of a fault in the material under test. This indication may be used in place of, or in addition to, the other indicating means mentioned.

The automatic cable testing machine shown in Figures 4 to 8 inclusive of the drawings will now be described, firstly, with reference mainly to Figures 4 to 7 inclusive which show the general mechanical lay-out of the machine and, secondly, with reference to Figure 8 which shows the lay-out of the electrical circuit. In these figures parts that correspond to parts previously shown in and described with reference to the other figures are indicated by the same reference numerals. The machine comprises a main supporting frame constructed of rolled sections 20. The cable 1 to be tested is drawn from a supply reel 22, mounted at one end of the frame, over a guide pulley 23, and through the electrode 2 enclosed in the chamber 21, by means of a haul-off device located in front of the chamber. This device consists of a capstan wheel 24 and an idle wheel 25. The former is mounted on a shaft 26 driven by the motor 27 through a rope or belt drive 28. The cable is passed several times round the haul-off device and then proceeds over the distributing pulley 29 to the take-up reel 30, where the leading end of its conductor is earthed, as shown diagrammatically in Figure 8, by connecting it to the spindle of the reel 30 which makes contact with the frame of the machine which is earthed. The drive to the take-up reel is taken from the shaft 26 and is through chain wheel 31, chain 34, chain wheel 33 and shaft 40 on which the reel 30 is supported, a slipping coupling 32 being inserted between the wheel 31 and its shaft 26, to limit the tension in the part of the cable between the haul-off device and the take-up reel. The distributing pulley 29 is given a reciprocating movement in an axial direction in the usual manner by means of an automatic traversing gear 35 mounted on the shaft 36. The latter is driven, by means of chain wheels 37 and 38 and chain 39, from the shaft 40. It will be observed that both reels are supported in open bearings 41 in a manner that permits them to be readily removed and replaced by fresh reels. To this end, the reel 30 is driven through a dog clutch 42 and the reel 22 is coupled through a similar clutch 43 on the reel-supporting shaft to a brake 44, the braking force normally exerted by which can be adjusted by a tension spring 45. Normally the braking force applied is just sufficient to prevent over running of the cable. The spring 45 is anchored at one end to the core of a solenoid 46 in a relay circuit that may be closed, as hereinafter described, when the motor is stopped on the occurrence of a fault. This ensures under such conditions an increase in the braking force that is sufficient to bring the reel 22 quickly to rest. In front of the electrode chamber 21 is disposed a marker 47 which may be brought into operation by electromagnetic means whenever a fault is detected so as to mark the cable at or near the place where the fault exists. This marker may be of any suitable kind such as, for instance, a vertically reciprocable roller or pad to which a supply of a marking power or fluid is fed.

The electrical apparatus and recording and indicating instruments are mounted in the cabinet 48 under the electrode chamber 21. Power is taken from a source of A. C. supply 5, for instance, a 230 volt, 50 cycle supply, to feed the primary of the high tension transformer 4. Between the latter and the source of supply are inserted double pole switches 51, and 55, fuses 52 and push switches 53 and 54 which are respectively interlocked with the door of the cabinet 48 and that of the electrode chamber 21 so that power cannot be supplied to the transformer whilst access may be had to the high tension circuit. A pilot lamp 56 is connected across the primary of the transformer 4 and is mounted on the instrument panel 49 at the front of the cabinet 48. One end of the secondary winding of this transformer is connected through a high frequency choke 57 and a condenser 3 by a screened cable to the electrode 2 enclosed in the chamber 21, the capacity between the screened connection to the electrode and earth being represented by the condenser 59. The other end of the winding is connected to earth through a similar choke 58 and a high frequency inductance 6 having voltage tappings. As in the previously described examples, the high tension side of the transformer is short circuited as regards high frequency currents by a condenser 7. To limit the voltage across the inductance 6, its ends are connected to the electrodes of a safety spark gap 50. The provision of the tappings on the inductance coil 6 enables the sensitivity of the apparatus to be controlled by limiting to a predetermined amount the proportion of the high frequency voltage applied to the grid of the valve.

The valve 8 is a grid controlled mercury vapour valve and is supplied through the transformer 60 of which the primary winding is connected through the fuses 61 to the dead side of the switch 51, undesirable high frequency currents being eliminated from the supply by means of the filter condensers 62. The transformer 60 has three secondary windings, one 63 of these being used to supply current for heating the indirectly heated cathode of the valve and a second to supply a lamp 64, which serves as a pilot and to illuminate a fault counter to which reference will subsequently be made. The external circuit of the third winding is completed by connecting one end of the winding through a fuse 65 to earth and the other through a rectifier 66 and condenser 67 to earth. This furnishes a 200/300 volts D. C. supply to the anode of the valve 8 and to the unearthed end of a group of fixed and variable resistances 68, 69 and 70 which thus constitute a potential divider circuit for giving to the valve a grid bias voltage which can be varied by adjusting the value of the variable resistance 70 and/or by short-circuiting the comparatively low resistance 69 by the switch 71.

The D. C. supply to the anode is taken, not directly, but through the switch 12, a drop switch 72, a fault counter 73, the coil of the relay 9, and the switch 74 of the relay. When the machine is in operation switch 12 will be closed and the drop switch 72, which is a mercury switch actuated by a drop member 75 which falls to open the switch 72 when the end of the cable passes, will also be closed. When a fault is detected by the electrode, the valve 8 is triggered as previously described. The resultant flow of current in the external anode-cathode circuit operates the electromagnetic counter 73, which may be of any suitable known kind, and also opens the relay switch 74 which is preferably a mercury switch. This interrupts the flow through the valve and relay with the result that the valve returns to its normal inactive condition and switch 74 closes again. It will be appreciated that it is impossible for the latter to close again before the valve becomes inactive owing to the extremely short time (a fraction of a milli-second) required for the grid to regain control. By the time the switch 74 has returned to its normal condition the fault has travelled past the electrode, consequently the same fault will not be detected twice. The counter 73 thus records the number of faults in a length of cable but it is prevented from counting the bared end of the cable as a fault by the dropper actuated switch 72.

The relay 9 may also actuate other switches 76 and 77 both of which are also preferably mercury switches. The former is inserted in a fault indicating circuit 78 connected in parallel with the primary of transformer 69. Normally the circuit is interrupted by the switch 76 but is completed on the detection of a fault. Connected to this circuit is the primary of a transformer 79 across the secondary of which is connected an alarm bell 80. When a fault is detected the alarm bell rings. A lamp 81 may also be connected to the circuit 78 to provide a visible indication of the presence of a detached fault. In addition, the coil 82 of the solenoid operated marker 48 may be connected through a switch 83 to the fault indicating circuit. When switch 83 is closed the marker will be operated each time a fault in the cable insulation is detected. The signals given by bell 80 and lamp 81 will be cancelled and the marker 48 restored to normal when the relay switches are returned to normal.

If it is desired the signals can be made to persist by closing switch 174, which short circuits relay switch 74 and prevents the valve from returning to its inactive condition automatically. In this case the machine is stopped whenever a fault is detected. For this purpose the third relay operated switch 77 is employed to interrupt the trip circuit of a circuit breaker in the supply circuit of the driving motor 27. In the drawings this motor is shown as connected through a single pole breaker 85 to a suitable source of supply 86. Normally the switch 77 is closed and the circuit of the trip coil 87 completed. Whenever a fault is detected, switch 77 opens and the breaker 85 is tripped. By providing a second switch 88, similar to and actuated in the same manner as switch 72, in the trip circuit of the breaker, the motor is stopped when the bare end of the cable passes the drop member 75. If it is not desired to stop the motor at each fault but only at the end of a length of cable, switch 88 is closed to short circuit switch 77 and switch 174 is opened to allow the relay switches 74 and 76 to return to normal after the detection of each fault.

In conjunction with the motor stopping arrangements it is advisable to employ a device which will simultaneously arrest the rotation of the supply reel 22. This is effected by closing switch 90 which connects the solenoid 46 of the brake 43 to the fault indicating circuit 78. On the detection of a fault the solenoid is energized and the normal retarding force of the brake augmented sufficiently to bring the reel quickly to rest. It will be apparent that this device must be thrown out of action, by opening switch 90, when it is not desired to stop the motor at each fault i. e. when switch 88 is closed.

It will be seen therefore that the above described example of fault testing apparatus can be used automatically to signal and mark and count all faults (except the bare end) and to stop the motor as the bare end of the cable passes the drop member 75 or alternatively to stop the motor and apply a brake to the supply reel at each fault and to stop the motor as the bare end passes the drop member. If it is desired to apply a brake to the supply reel 42 when it becomes empty, the downward movement of the drop member 75 may actuate a third drop switch (not shown) which simultaneously short circuits relay switch 76 and interrupts the supply to the coil 82 of the marker 48. In this case the bell 80 will ring continuously and lamp 81 will remain alight to warn the operator that the whole length has been tested but no false marking of the cable will result.

What I claim as my invention is:

1. Apparatus for testing insulating material by subjecting it to a voltage sufficient to produce a discharge of electricity at weak points in the material, comprising a high voltage testing electrode, a high frequency circuit, means influenced by the condition of matter adjacent said electrode for setting up high frequency currents in said circuit, a high frequency impedance in said circuit, an operative circuit, a mercury vapour valve inserted in said operative circuit and having a control grid normally biased to prevent flow of current through said valve and operative circuit, and means associating said impedance with the control grid and cathode of said valve whereby a high frequency potential produced by flow of said high frequency currents through said impedance exercises a trigger action on said valve and starts a flow of current in said operative circuit.

2. Apparatus for testing insulating material by subjecting it to a voltage sufficient to produce a discharge of electricity at weak points in the material, comprising a high voltage testing electrode, a high frequency circuit including a high frequency impedance, means influenced by the condition of matter adjacent said electrode for setting up high frequency currents in said circuit, an operative circuit, a neon tube inserted in said operative circuit and subjected to a voltage just below the normal discharge voltage value of the tube, and an external control member for said tube in association with said impedance whereby a high frequency potential produced by flow of said high frequency currents through said impedance exercises a trigger action on said tube and starts a flow of current in said operative circuit.

3. Apparatus for testing insulating material by subjecting it to a voltage sufficient to produce a discharge of electricity at weak points in the material, comprising a high voltage testing electrode, a high frequency circuit, means influenced by the condition of matter adjacent said electrode for setting up high frequency currents in said circuit, an operative circuit, a neon tube inserted in said operative circuit and subjected to a voltage just below the normal discharge voltage value of the tube, and a high frequency inductance coil embracing said tube and associated with said high frequency circuit whereby the said high frequency currents are enabled to exercise a trigger action on the said tube and start a flow of current in said operative circuit.

4. In apparatus for testing insulating material by means of a testing electrode maintained at a direct current or low-frequency alternating current voltage sufficiently high to cause a discharge of electricity to take place at weak points in the material under test, a second electrode associated with the high voltage testing electrode, an operative circuit, a gaseous discharge tube forming part of said circuit and normally preventing flow of current therein, a high frequency oscillatory circuit, extending from the high voltage testing electrode to said second electrode, in which high frequency currents are set up when a discharge at the testing electrode takes place, and means associating said gaseous discharge tube and said high frequency circuit whereby said high frequency currents in the latter exercise a trigger action on said tube and start a flow of current in said operative circuit.

5. In apparatus for testing insulating material by moving it past an electrode maintained at a direct, or low-frequency alternating, current voltage sufficient to produce a discharge of electricity at a fault in the material, a source of supply, a test circuit extending from one terminal of said source through an electrode, the material under test, a second electrode and a high frequency impedance to the other terminal of said source, a high frequency oscillatory circuit extending from one electrode, through a condenser connected across said source and through the high frequency impedance, to the second electrode, an operative circuit including a low pressure gaseous discharge tube normally serving to prevent flow of current therein, and means associating said high frequency circuit and said tube, whereby high frequency currents set up in said high frequency circuit due to a discharge at a fault in the material under test exert a trigger action on said tube which thereupon permits a flow of current in said operative circuit.

6. In apparatus for testing insulating material by means of a testing electrode maintained at a direct, or low-frequency alternating, current voltage sufficiently high to cause a discharge of electricity to take place at weak points in the material, a second electrode associated with the high voltage testing electrode, an operative circuit, a low pressure gaseous discharge tube inserted in said operative circuit and having a control grid normally biased to prevent flow of current through said tube and operative circuit, a high frequency oscillatory circuit, extending from the high voltage testing electrode to said second electrode, in which high frequency currents are set up when a discharge at the testing electrode takes place, a high frequency impedance in said high frequency circuit, and means associating said impedance with the control grid and cathode of said tube whereby a high frequency potential produced by flow of said high frequency currents through said impedance exercises a trigger action on said tube and starts a flow of current in said operative circuit.

7. In apparatus for testing insulating material by means of a testing electrode maintained at a voltage sufficiently high to cause a discharge of electricity to take place at weak points in the material under test, a second electrode associated with the high voltage testing electrode, an operative circuit, a gaseous discharge tube forming part of said circuit and normally preventing flow of current therein, a high frequency oscillatory circuit extending from the high voltage testing electrode to said second electrode, which is normally substantially free from high frequency currents but in which high frequency currents are set up when a discharge at the testing electrode takes place, and means associating said gaseous discharge tube and said high frequency circuit whereby said high frequency currents in the latter exercise a trigger action on said tube and start a flow of current in said operative circuit.

8. In apparatus for testing insulating material by moving it past an electrode maintained at a voltage sufficient to produce a discharge of electricity at a fault in the material, a source of supply, a test circuit extending from one terminal of said source through an electrode, the material under test, a second electrode and a high frequency impedance to the other terminal of said source, a high frequency oscillatory circuit which is normally substantially free from high frequency currents and extends from one electrode through a condenser connected across said source and through the high frequency impedance to the second electrode, an operative circuit including a low pressure gaseous discharge tube normally serving to prevent flow of current therein, and means associating said high frequency circuit and said tube, whereby high frequency currents set up in said high frequency circuit due to a discharge at a fault in the material under test exerts a trigger action on said tube which thereupon permits a flow of current in said operative circuit.

9. In apparatus for testing insulating material by means of a testing electrode maintained at a voltage sufficiently high to cause a discharge of electricity to take place at weak points in the material, a second electrode associated with the high voltage testing electrode, an operative circuit, a low pressure gaseous discharge tube inserted in said operative circuit and having a control grid normally biased to prevent flow of current through said tube and operative circuit, a high frequency oscillatory circuit which is normally substantially free from high frequency currents and extends from the high voltage testing electrode to the second electrode but in which high frequency currents are set up when a discharge at the testing electrode takes place, a high frequency impedance in said high frequency circuit, and means associating said impedance with the control grid and cathode of said tube whereby a high frequency potential produced by flow of said high frequency currents through said impedance exercises a trigger action on said tube and starts a flow of current in said operative circuit.

JOHN HENRY SAVAGE.